(12) United States Patent
Jin et al.

(10) Patent No.: US 11,073,394 B2
(45) Date of Patent: Jul. 27, 2021

(54) SENSOR UNIT, ELECTRONIC APPARATUS AND VEHICLE

(71) Applicant: SEIKO EPSON CORPORATION, Tokyo (JP)

(72) Inventors: Mikimoto Jin, Chino (JP); Hisao Motoyama, Suginami-ku (JP)

(73) Assignee: Seiko Epson Corporation, Tokyo (JP)

( * ) Notice: Subject to any disclaimer, the term of this patent is extended or adjusted under 35 U.S.C. 154(b) by 97 days.

(21) Appl. No.: 16/667,581

(22) Filed: Oct. 29, 2019

(65) Prior Publication Data

US 2020/0132459 A1 Apr. 30, 2020

(30) Foreign Application Priority Data

Oct. 29, 2018 (JP) .............................. JP2018-203278

(51) Int. Cl.
*G01C 19/5783* (2012.01)

(52) U.S. Cl.
CPC ................. *G01C 19/5783* (2013.01)

(58) Field of Classification Search
CPC .. G01D 11/245; G01D 11/24; G01C 19/5783; G01P 1/02; G01P 1/023
See application file for complete search history.

(56) References Cited

U.S. PATENT DOCUMENTS

| 2012/0227497 | A1 | 9/2012 | Eudier et al. |
| 2016/0025525 | A1* | 1/2016 | Jin .......................... G01P 1/023 73/431 |

FOREIGN PATENT DOCUMENTS

| JP | 2006-145258 | 6/2006 |
| JP | 2013-511029 | 3/2013 |

* cited by examiner

*Primary Examiner* — Walter L Lindsay, Jr.
*Assistant Examiner* — Andrew V Do
(74) *Attorney, Agent, or Firm* — Workman Nydegger

(57) ABSTRACT

A sensor unit includes a sensor module and a case having a storage space for storing the sensor module. In addition, the sensor module also includes an inertial sensor and a package for storing the inertial sensor. In addition, the package also includes a bottom surface and a side surface connected to the bottom surface. In addition, the case includes a bottom portion on which a protrusion is disposed, in which the protrusion protrudes into the storage space and includes a mounting surface for the bottom surface of the sensor module to be mounted, and an abutment portion having an abutment surface that abuts the side surface of the sensor module. Further, in plan view of the bottom portion, a separation distance between the abutment surface and the protrusion is longer than a separation distance between the abutment surface and the inertial sensor.

14 Claims, 12 Drawing Sheets

SENSOR UNIT, ELECTRONIC APPARATUS AND VEHICLE

The present application is based on, and claims priority from JP Application Serial Number 2018-203278, filed Oct. 29, 2018, the disclosure of which is hereby incorporated by reference herein in its entirety.

BACKGROUND

1. Technical Field

The present disclosure relates to a sensor unit, an electronic apparatus and a vehicle.

2. Related Art

For example, the gyro sensor described in JP-T-2013-511029 includes a resonator, an electrode holder on which a shaft of the resonator is fixed and which holds an electrode for operating the resonator, a base holding the electrode holder through a plurality of rods, and a cover fixed to the base and forming, with the base, a vacuum-sealed chamber containing the electrode holder and the resonator together.

However, in a case in which the electrode holder is fixed to the base, when a plurality of rods are used, the tolerance (minute difference in shape) of the plurality of rods makes it difficult to dispose the electrode holder parallel to the base, resulting in poor alignment accuracy.

Therefore, there is a problem that the shaft of the resonator is inclined and the measurement accuracy of the physical quantity is deteriorated.

SUMMARY

A sensor unit according to an aspect of the present disclosure includes a sensor module including an inertial sensor and a package for storing the inertial sensor, and a case including a storage space for storing the sensor module, in which the package includes a bottom surface, and a side surface connected to the bottom surface, and the case includes a bottom portion on which a protrusion is disposed, the protrusion protruding into the storage space and including a mounting surface on which the bottom surface of the sensor module is placed, and an abutment portion having an abutment surface abutting on the side surface of the sensor module, and in plan view of the bottom portion, a separation distance between the abutment surface and the protrusion is longer than a separation distance between the abutment surface and the inertial sensor.

DESCRIPTION OF EXEMPLARY EMBODIMENTS

Hereinafter, a sensor unit, an electronic apparatus, and a vehicle according to the present disclosure will be described in detail based on embodiments shown in the accompanying drawings.

First Embodiment

Figure 1:
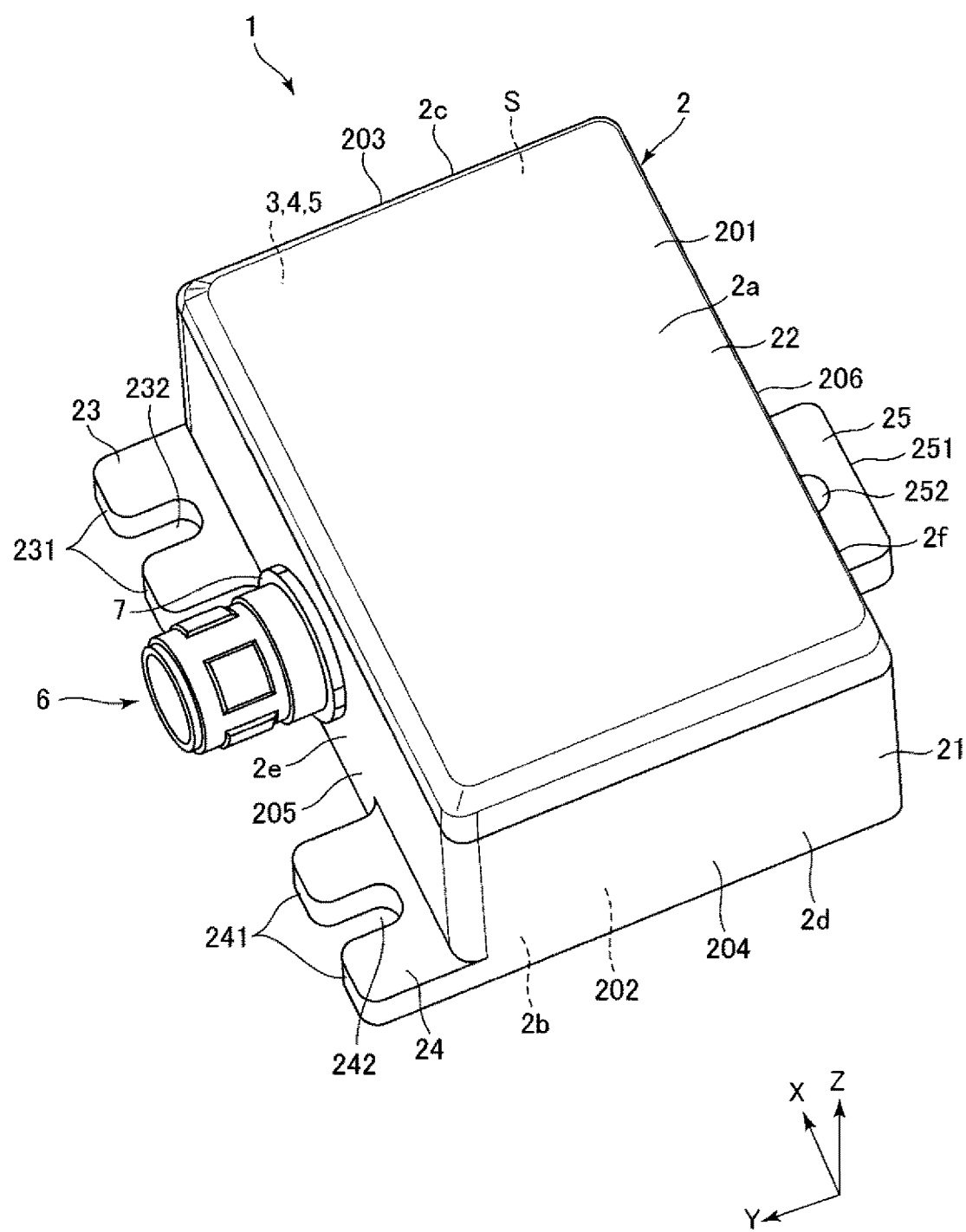
FIG. 1 is a perspective view showing a sensor unit according to a first embodiment of the present disclosure.
Figure 2:
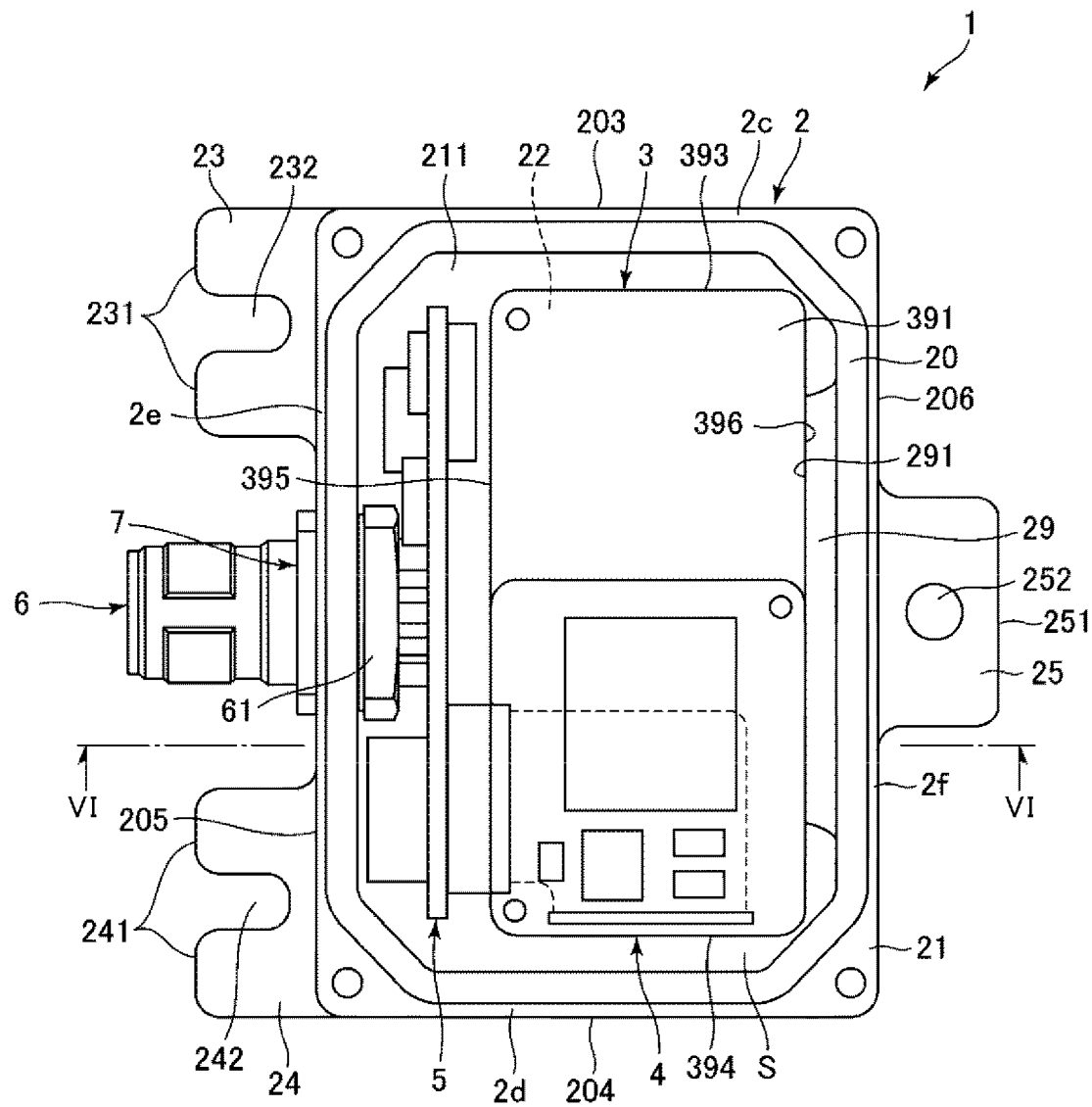
FIG. 2 is a plan view showing the sensor unit shown in FIG. 1, from which a cover is removed.
Figure 3:
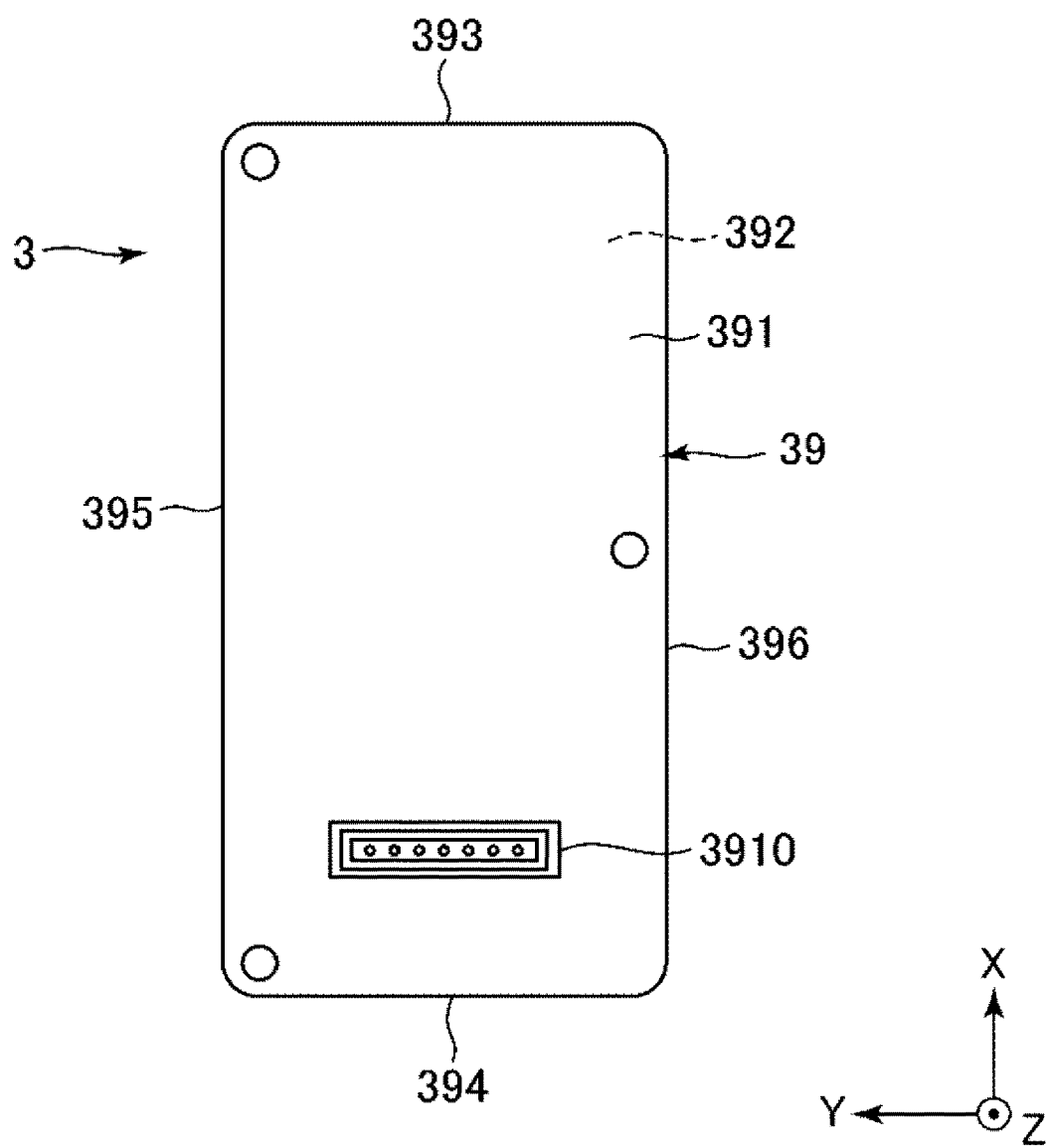
FIG. 3 is a plan view showing a sensor module included in the sensor unit shown in FIG. 1.
Figure 4:
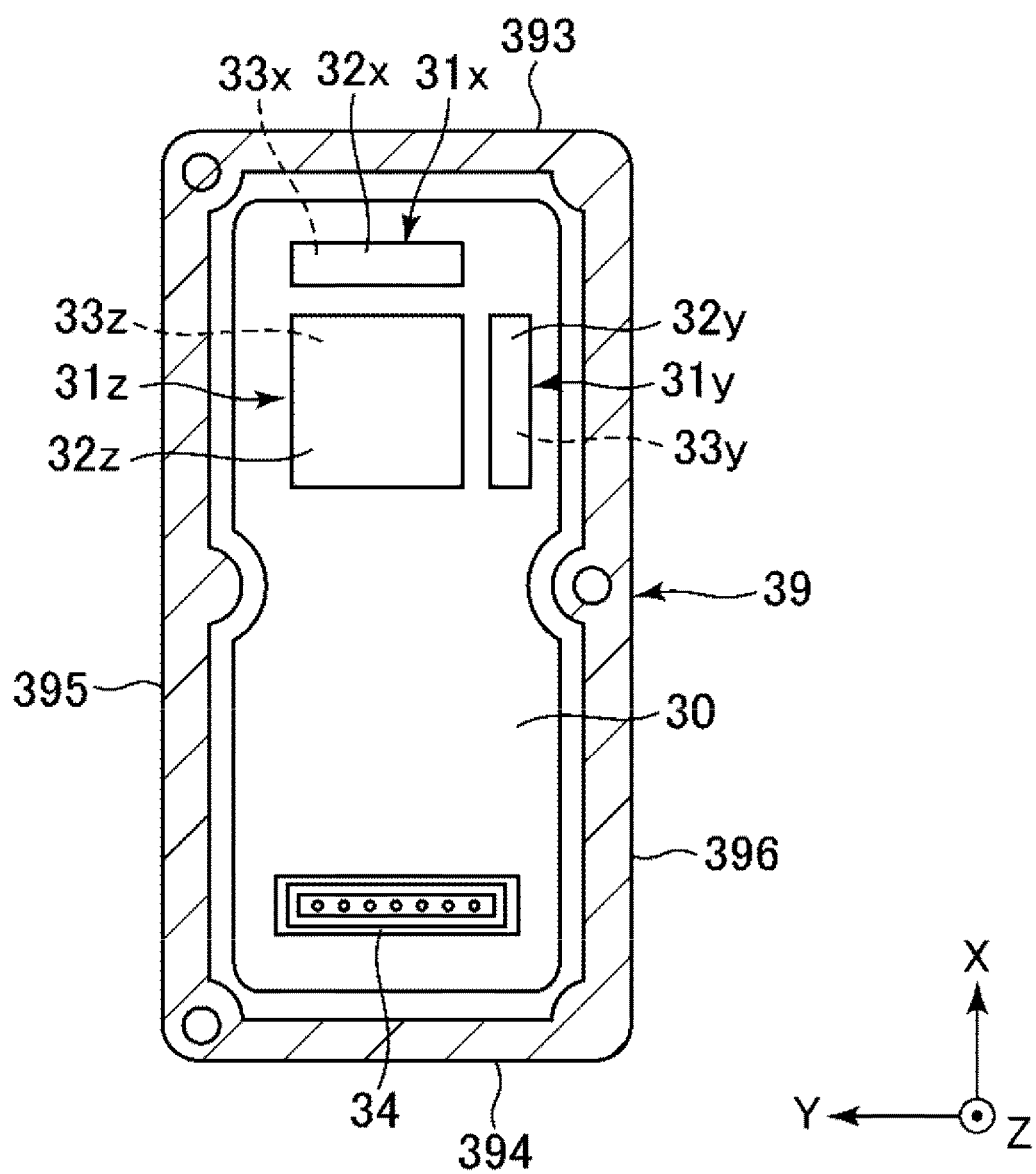
FIG. 4 is a cross-sectional view showing the inside of the sensor module shown in FIG. 3.
Figure 5:
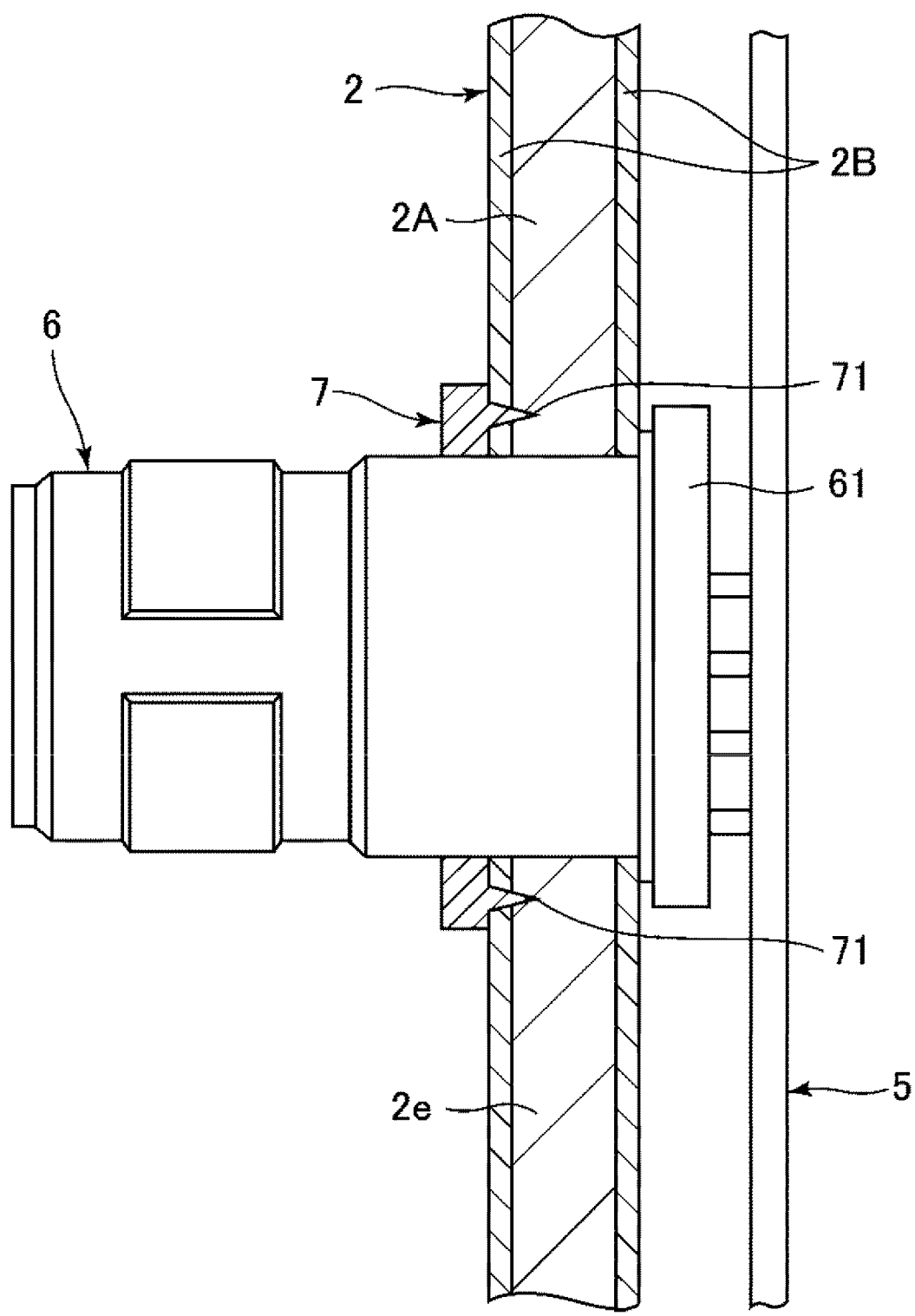
FIG. 5 is a cross-sectional view showing a structure of a case included in the sensor unit shown in FIG. 1.
Figure 6:
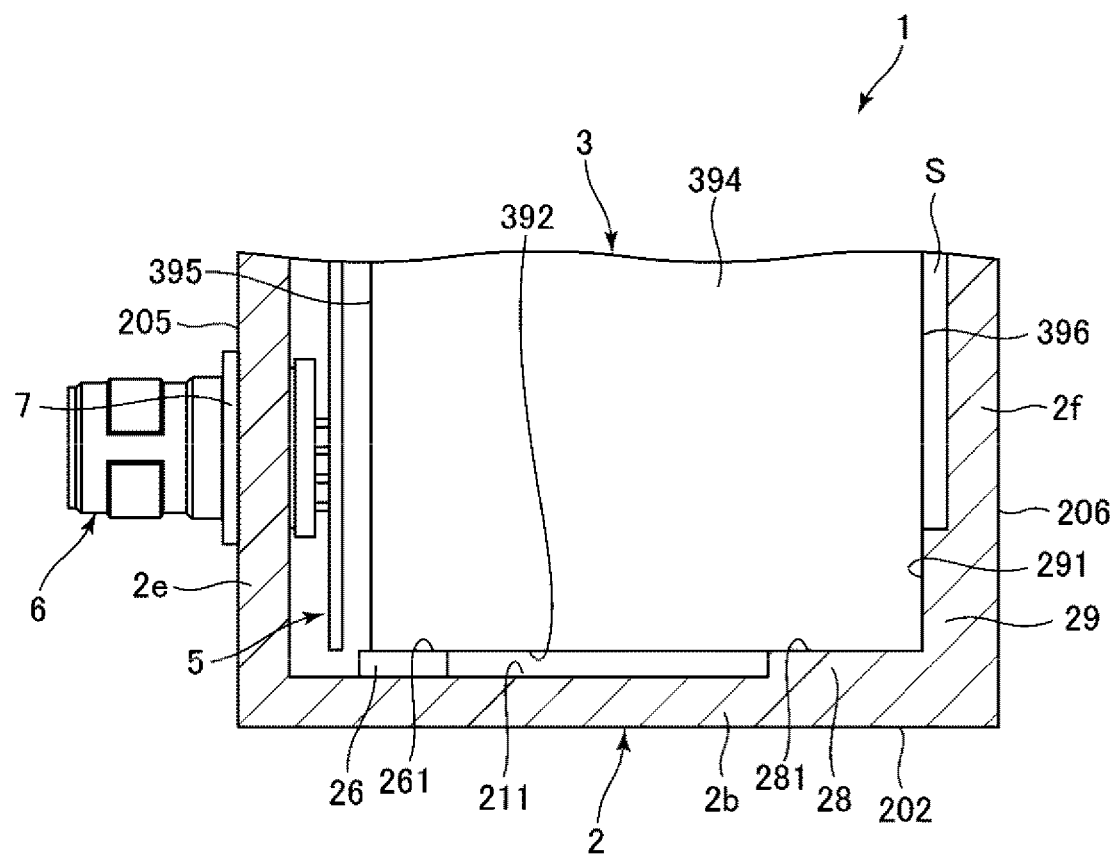
FIG. 6 is a cross-sectional view taken along the line VI-VI in FIG. 2.
Figure 7:
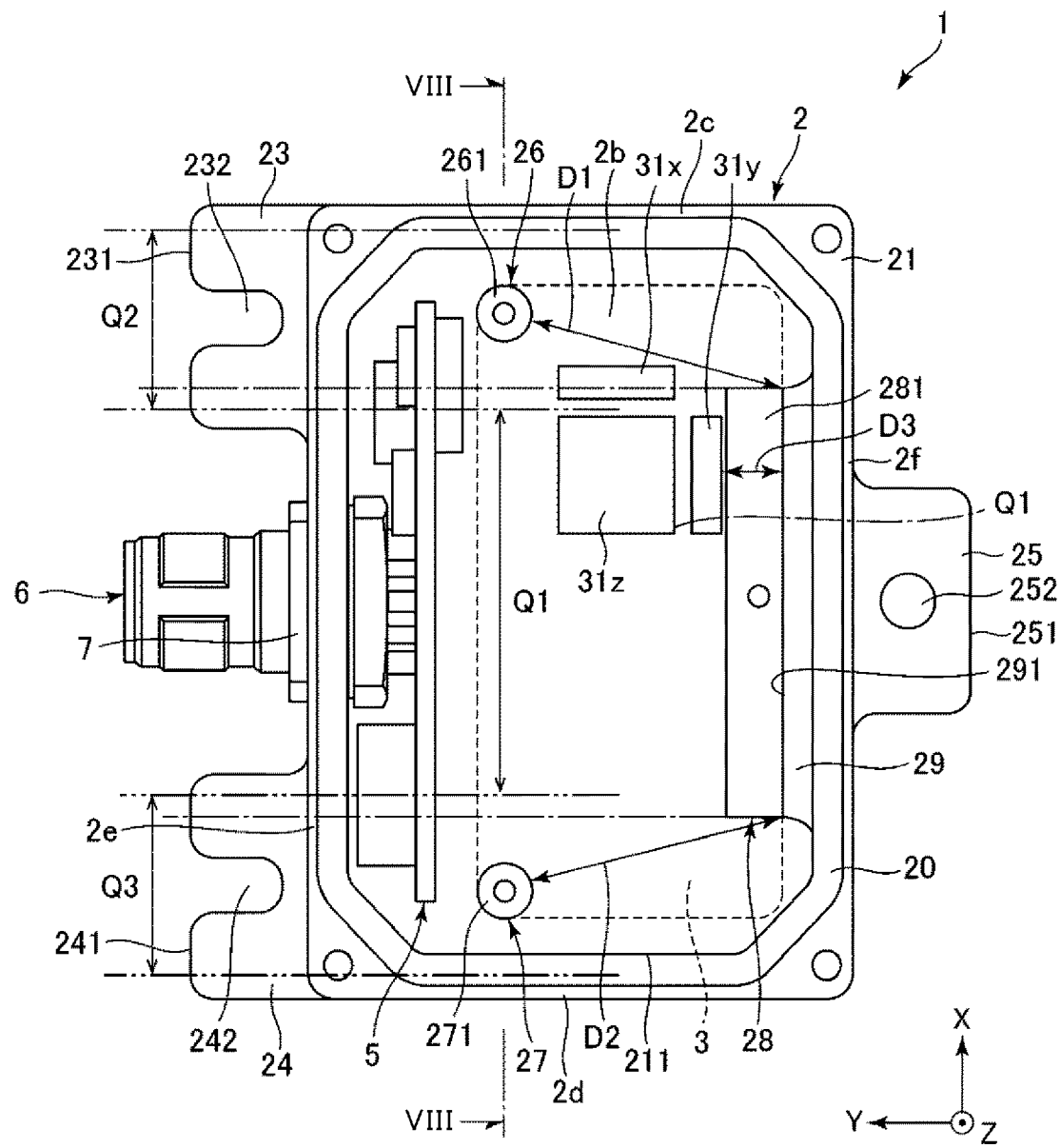
FIG. 7 is a plan view showing an internal structure of the case.
Figure 8:
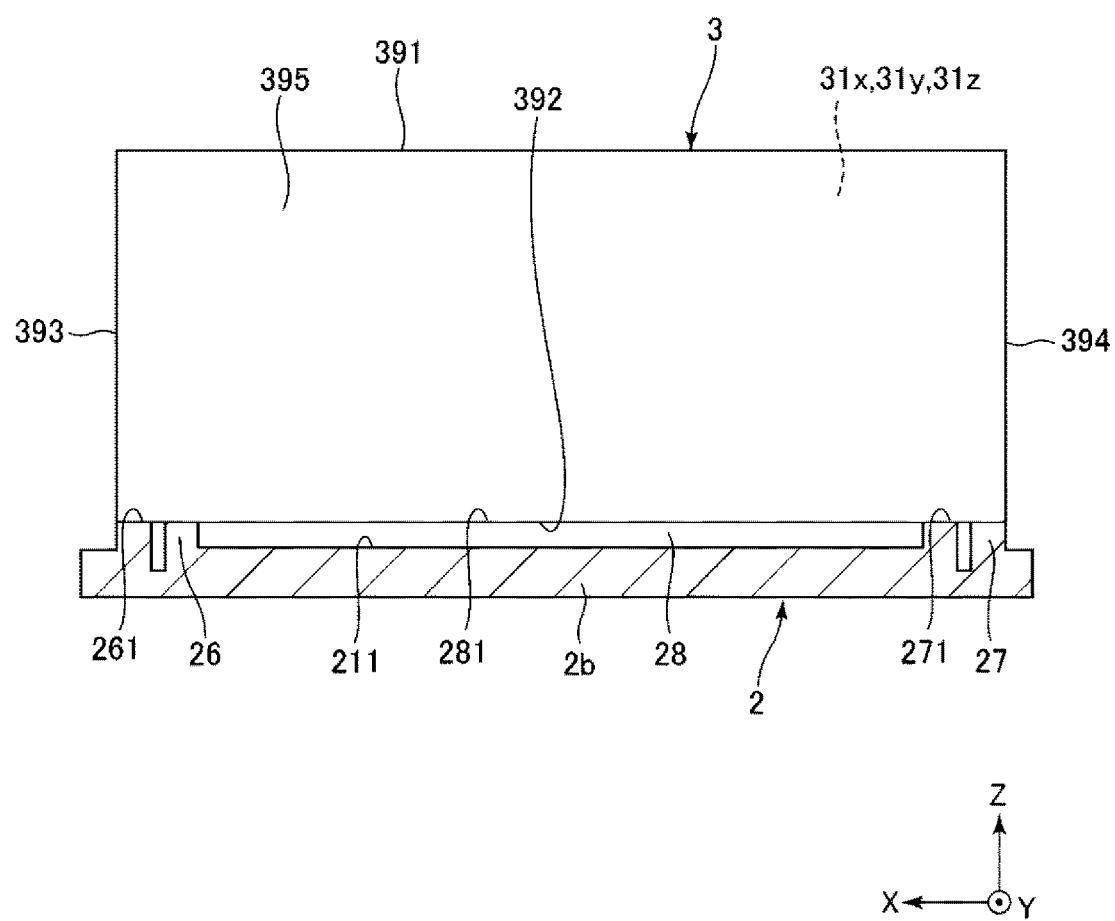
FIG. 8 is a cross-sectional view taken along the line VIII-VIII in FIG. 7.

FIG. 1 is a perspective view showing a sensor unit according to the first embodiment of the present disclosure. FIG. 2 is a plan view showing the sensor unit shown in FIG. 1, from which a cover is removed. FIG. 3 is a plan view showing a sensor module included in the sensor unit shown in FIG. 1. FIG. 4 is a cross-sectional view showing the inside of the sensor module shown in FIG. 3. FIG. 5 is a cross-sectional view showing a structure of a case included in the sensor unit shown in FIG. 1. FIG. 6 is a cross-sectional view taken along the line VI-VI in FIG. 2. FIG. 7 is a plan view showing an internal structure of the case. FIG. 8 is a cross-sectional view taken along the line VIII-VIII in FIG. 7.

In each drawing, an X axis, a Y axis, and a Z axis which are three axes orthogonal to each other are illustrated. In addition, the direction parallel along the X axis is also referred to as an "X axis direction", the direction parallel along the Y axis is also referred to as a "Y axis direction", and the direction parallel along the Z axis is also referred to as a "Z axis direction". In each axis, a leading end side of the arrow is also referred to as "positive side", and the opposite side is also referred to as "negative side". Further, the positive side in the Z axis direction is also referred to as "upper side", and the negative side in the Z axis direction is also referred to as "lower side".

In the present specification, the term "orthogonal" includes not only a case where two elements intersect each other at 90°, but also a case where two elements intersect each other at an angle which is slightly inclined from 90°, for example, within a range of 90°±5°. Specifically, a case where the X axis is inclined within a range of ±5° with respect to a normal direction to a YZ plane, a case where the Y axis is inclined within a range of ±5° with respect to a normal direction to an XZ plane, and a case where the Z axis is inclined within a range of ±5° with respect to a normal direction to an XY plane are also included in the term "orthogonal". Further, in the description of the present application, the term "parallel" includes a case where one is slightly inclined with respect to the other, for example, within ±5°, in addition to the case of being completely parallel.

The sensor unit 1 shown in FIG. 1 may independently measure each of an acceleration in the X axis direction, an acceleration in the Y axis direction, and an acceleration in the Z axis direction. Such a sensor unit 1 includes a waterproof case 2 as shown in FIG. 1. In addition, as shown in FIG. 2, the sensor unit 1 includes a sensor module 3, a circuit substrate 4, a connector substrate 5, and a connector 6 stored in the case 2, and a fixing member 7 as a conductive member for fixing the connector 6 to the case 2. Each of these units will be sequentially described below.

Sensor Module 3

The sensor module 3 is a three-axis acceleration sensor, and may independently measure each of an acceleration in the X-axis direction, an acceleration in the Y-axis direction, and an acceleration in the Z-axis direction. As shown in FIGS. 3 and 4, the sensor module 3 includes amounting substrate 30 and three acceleration sensors $31x$, $31y$, and $31z$ as inertial sensors mounted on the mounting substrate 30, a connector 34 mounted on the mounting substrate 30 and electrically connected to the acceleration sensors $31x$, $31y$, and $31z$, and a package 39 for storing these. Then, the acceleration sensor $31x$ measures an acceleration in the X axis direction, the acceleration sensor $31y$ measures an acceleration in the Y axis direction, and the acceleration sensor $31z$ measures an acceleration in the Z axis direction.

The acceleration sensor $31x$ includes an acceleration sensor element $32x$ and an element package $33x$ for storing the acceleration sensor element $32x$, and is mounted on the mounting substrate 30 such that a measurement axis of the acceleration sensor element $32x$ is disposed along the X axis. Likewise, the acceleration sensor $31y$ includes an acceleration sensor element $32y$ and an element package $33y$ for storing the acceleration sensor element $32y$, and is mounted on the mounting substrate 30 such that the measurement axis of the acceleration sensor element $32y$ is disposed along the Y axis. Likewise, the acceleration sensor $31z$ includes an acceleration sensor element $32z$ and an element package $33z$ for storing the acceleration sensor element $32z$, and is mounted on the mounting substrate 30 such that the measurement axis of the acceleration sensor element $32z$ is disposed along the Z axis. The mounting substrate 30 mounted with the acceleration sensors $31x$, $31y$, and $31z$ and the connector 34 thereon is fixed to the package 39 by screwing.

The package 39 is formed of a resin material, for example. Further, the package 39 has a rectangular parallelepiped shape, and includes an upper surface 391 and a bottom surface 392 orthogonal to the Z axis, side surfaces 393 and 394 orthogonal to the X axis and side surfaces 395 and 396 orthogonal to the Y axis so that measurement axes of the acceleration sensors $31x$, $31y$ and $31z$ may be easily confirmed from the outside. As a result, the measurement axes of the acceleration sensors $31x$, $31y$, and $31z$ may be easily confirmed from each surface of the package 39. Further, an opening 3910 is formed in the upper surface 391 of the package 39, and the connector 34 is exposed from the opening 3910.

The sensor module 3 has been briefly described above. The configuration of the sensor module 3 is not limited to the configuration described above. For example, in the configuration described above, the sensor module 3 includes three acceleration sensors $31x$, $31y$, and $31z$ as inertial sensors, but the inertial sensors are not limited to this, and for example, one or two of the acceleration sensors $31x$, $31y$, and $31z$ may not be employed. In addition, as an inertial sensor, an angular velocity sensor may be used instead of the acceleration sensor, or both the acceleration sensor and the angular velocity sensor may be used. In particular, as an inertial sensor, in addition to the acceleration sensors $31x$, $31y$ and $31z$ described above, an angular velocity sensor that measures an angular velocity around the X axis, an angular velocity sensor that measures an angular velocity around the Y axis, and an angular velocity sensor that measures an angular velocity around the Z axis may be used to obtain an inertial measurement device (IMU: Inertial Measurement Unit) functioning as a six-axis motion sensor, and as a result, the sensor unit 1 capable of exhibiting excellent convenience may be obtained.

Further, in the configuration described above, the three acceleration sensor elements $32x$, $32y$ and $32z$ are respectively stored in different element packages $33x$, $33y$ and $33z$, but this is without limitation, and for example, three acceleration sensor elements $32x$, $32y$ and $32z$ may be stored in one common element package. Specifically, for example, three acceleration sensor elements $32x$, $32y$ and $32z$ may be stored in the element package $33x$, and the other element packages $33y$ and $33z$ may not be employed.

Case

As shown in FIG. 5, the case 2 is formed of a conductive base part 2A and an insulating coating layer 2B that covers the base part 2A. The constituent material of the base part 2A is not particularly limited, and for example, various metal materials such as aluminum, titanium, and magnesium can be used, and in the present embodiment, aluminum is used. In addition, the constituent material of the coating layer 2B is not particularly limited, and for example, an anodic oxide film obtained by oxidizing the surface of the base part 2A may be used, and in the present embodiment, alumite is used. The case 2 is manufactured by die casting or metal casting method.

As described above, by manufacturing the case 2 using the metal casting method, for example, the case 2 may be manufactured more inexpensively and in a shorter time as compared with an example where case 2 is manufactured using a metal cutting method, a metal forging method, and the like. However, the method of manufacturing the case 2 is not limited to the metal casting method.

In addition, as shown in FIG. 1, the case 2 includes a housing 21 and a cover 22. As shown in FIG. 2, the housing 21 is in the form of a box including a bottomed depressed portion 211 opened to an upper surface side, and the cover 22 is fixed to the housing 21 so as to close the opening of the depressed portion 211. As a result, a storage space S is formed in the case 2, and the sensor module 3, the circuit substrate 4, the connector substrate 5 and the connector 6 are stored in the storage space S. In addition, a packing 20 is provided between the housing 21 and the cover 22 to secure the airtightness of the storage space S.

Further, as shown in FIG. 1, the case 2 has a rectangular parallelepiped shape, and includes an upper surface 201 and a bottom surface 202 orthogonal to the Z axis, side surfaces 203 and 204 orthogonal to the X axis and side surfaces 205 and 206 orthogonal to the Y axis so that measurement axes of the sensor module 3 may be easily confirmed from the outside. Thereby, the X axis, the Y axis, and the Z axis which are measurement axes of the sensor module 3 may be easily confirmed from each surface of the case 2. Therefore, the sensor unit 1 may be easily mounted on an object. The case 2 includes a top portion $2a$ of which outer surface is the upper surface 201, a bottom portion $2b$ of which outer surface is the bottom surface 202 and which is disposed to face the top portion $2a$ with the storage space S interposed therebetween, a side wall portion $2c$ of which outer surface is the side surface 203, a side wall portion $2d$ of which outer surface is the side surface 204 and which is disposed to face the side wall portion $2c$ with the storage space S interposed therebetween, a side wall portion $2e$ of which outer surface is the side surface 205, and a side wall portion 2*f* of which outer surface is the side surface 206, and which is disposed to face the side wall portion 2*e* with the storage space S interposed therebetween.

Further, as shown in FIGS. 2 and 6, the case 2 includes an abutment portion 29 disposed on the side wall portion 2*f*. The abutment portion 29 protrudes from the side wall portion 2*f* toward the inside of the storage space S to the positive side in the Y axis direction. Further, the top surface, that is, the front end surface of the abutment portion 29 is an abutment surface 291 abutted with the side surface 396 of the sensor module 3. The abutment surface 291 is formed in an XZ plane parallel to both the X axis and the Z axis, and is a plane having the Y axis as a normal. Therefore, by having the side surface 396 of the sensor module 3 abutting on the abutment surface 291, the alignment accuracy of the sensor module 3 with respect to the case 2 is enhanced, and the measurement axis of the sensor module 3, specifically, the measurement axes of the acceleration sensors 31*x* and 31*y* with respect to each surface 201 to 206 of the case 2 may be accurately aligned. In particular, in the present embodiment, the abutment surface 291 has a longitudinal shape along the X axis direction, so that the posture of the sensor module 3 abutting the abutment surface 291 is more stable. Therefore, the effect described above may be exhibited more significantly.

Moreover, the abutment surface 291 is formed by a cutting surface. That is, the abutment surface 291 is formed by cutting a front end surface of the abutment portion 29 after manufacturing the case 2 by the metal casting method. As a result, the flatness and the parallelism of the abutment surface 291 with respect to the XZ plane may be enhanced from the state as manufactured by the metal casting method, and thus the alignment accuracy of the sensor module 3 with respect to the case 2 is further enhanced. In addition, only the abutment surface 291 is cut as a cutting surface, so that the cutting area is reduced as compared with the case where the entire case 2 is formed by cutting, resulting in shortened processing time. Here, the "cutting surface" means a surface that has been further ground or polished using a grinding stone or the like as a finish, and a surface formed by cutting, grinding or polishing without cutting, as well as a surface formed by cutting or cutting using a cutting tool such as a cutting tool or drill.

In addition, since a machining mark by cutting process remains in a cutting surface, it may be determined by the presence or absence of the machining mark whether or not the abutment surface 291 is the cutting surface. In addition, since the surface roughness Ra of the cutting surface formed by cutting is very small relative to the surface roughness of the surface as manufactured by the casting method, whether or not the abutment surface 291 is the cutting surface may be determined by comparing the surface roughness of the abutment surface 291 with the surface roughness of the other portion of the case 2, for example, with the surface roughness of the bottom surface of the depressed portion 211. The meaning and the determination method of the cutting surface as described above equally applies for the cutting surface to be described below.

In addition, as shown in FIG. 7, the case 2 includes three protrusions 26, 27, and 28 disposed on the bottom portion 2*b*. The protrusions 26, 27, and 28 respectively protrude from the bottom surface of the depressed portion 211 toward the inside of the storage space S to the positive side in the Z axis direction. Further, the top surfaces, that is, the front end surfaces of the protrusions 26, 27, and 28 are mounting surfaces 261, 271, and 281 on which the sensor module 3 is mounted. More specifically, as shown in FIG. 8, with the bottom surface 392 of the sensor module 3 in contact with the mounting surfaces 261, 271, and 281, the sensor module 3 is mounted on the mounting surfaces 261, 271, and 281. Further, holes for screwing are formed in the protrusions 26, 27, and 28, and the sensor module 3 is screwed to the respective protrusions 26, 27, 28 in a state where the side surface 396 abuts the abutment surface 291.

Further, the mounting surfaces 261, 271, and 281 are respectively formed in an XY plane parallel to both the X axis and the Y axis, and are located on the same plane. Thereby, the bottom surface 392 of the sensor module 3 on the mounting surfaces 261, 271, and 281 is parallel to the XY plane, and the alignment accuracy of the sensor module 3 with respect to the case 2 is further enhanced. Therefore, the measurement axis of the sensor module 3, in particular, the measurement axis of the acceleration sensor 31*z* may be accurately aligned with the surfaces 201 to 206 of the case 2.

Further, as shown in FIG. 7, the protrusions 26 and 27 are disposed apart from each other along the X axis direction, and the protrusion 28 is disposed to be shifted with respect to the protrusions 26 and 27 in the Y-axis direction. That is, the protrusions 26, 27, and 28 are two-dimensionally disposed, whereby the posture of the sensor module 3 mounted on the mounting surfaces 261, 271, and 281 is more stable. In particular, since the protrusion 28 disposed to be shifted in the Y axis direction with respect to the protrusions 26 and 27 has a longitudinal shape along the X axis, the effect described above may be exhibited more significantly. In addition, the protrusion 28 is connected to the abutment portion 29.

Further, as shown in FIG. 7, in plan view from the Z axis direction, the protrusions 26 and 27 are located outside a region Q1 in which the abutment surface 291 extends in the normal direction, that is, the Y axis direction. Specifically, the protrusion 26 is located on the positive side in the X axis direction of the region Q1, and the protrusion 27 is located on the negative side in the X axis direction of the region Q1. As a result, a portion of the bottom surface 392 of the sensor module 3 which is closer to the outer edge may be supported by the mounting surfaces 261 and 271 of the protrusions 26 and 27, so the posture of sensor module 3 mounted on the mounting surfaces 261, 271 and 281 is further stabilized. However, the present disclosure is not limited to this, and at least one of the protrusions 26 and 27 may be located inside the region Q1.

Further, as shown in FIG. 7, in plan view from the Z axis direction, the separation distance D1 between the abutment surface 291 and the protrusion 26 is longer than the separation distance D3 between the abutment surface 291 and the acceleration sensors 31*x*, 31*y*, and 31*z*. Likewise, in plan view from the Z axis direction, the separation distance D2 between the abutment surface 291 and the protrusion 27 is longer than the separation distance D3 between the abutment surface 291 and the acceleration sensors 31*x*, 31*y*, and 31*z*. That is, the sensor unit 1 satisfies the relationships of D1>D3 and D2>D3. Here, the separation distance D1 means the shortest distance between the abutment surface 291 and the mounting surface 261 of the protrusion 26, the separation distance D2 means the shortest distance between the abutment surface 291 and the mounting surface 271 of the protrusion 27, and the separation distance D3 means the shortest distance among the shortest distance between the abutment surface 291 and the acceleration sensor 31*x*, the shortest distance between the abutment surface 291 and the acceleration sensor 31*y*, and the shortest distance between the abutment surface 291 and the acceleration sensor 31z. Thus, by satisfying the relationship of D1, D2>D3, the mounting surfaces 261, 271 and the abutment surface 291 may be sufficiently separated, and the alignment accuracy of the sensor module 3 with respect to the case 2 is further enhanced.

Note that it suffices to satisfy the relationship of D1>D3, but it is preferable to satisfy the relationship of D1/D3>2, more preferable to satisfy the relationship of D1/D3>3, and still more preferable to satisfy the relationship of D1/D3>4. Likewise, it suffices to satisfy the relationship of D2>D3, but it is preferable to satisfy the relationship of D2/D3>2, more preferable to satisfy the relationship of D2/D3>3, and still more preferable to satisfy the relationship of D2/D3>4. As a result, the effect described above may be exhibited more significantly.

In addition, the mounting surfaces 261, 271, and 281 are formed by cutting surfaces. As a result, the flatness and the parallelism of the mounting surfaces 261, 271, and 281 with respect to the XY plane may be enhanced relative to the state as manufactured by the metal casting method, and thus the alignment accuracy of the sensor module 3 with respect to the case 2 is further enhanced.

Further, as shown in FIG. 1, the case 2 includes three protruding portions 23, 24, and 25 protruding to the outside of the storage space S. The protruding portions 23 and 24 protrude from the side wall portion 2e toward the positive side in the Y axis direction, and the protruding portion 25 protrudes from the side wall portion 2f toward the negative side in the Y axis direction. In addition, the protruding portion 23 is provided at the end of the side wall portion 2e on the positive side in the X axis direction, and the protruding portion 24 is provided at the end of the side wall portion 2e on the negative side in the X axis direction. The protruding portion 25 is provided at the center of the side wall portion 2f in the X axis direction.

Further, notches 232 and 242 through which screws may be inserted are formed in the protruding portions 23 and 24, and through hole 252 through which screws may be inserted is formed in the protruding portion 25. Then, the case 2 is fastened to the object by the screws inserted through the notches 232 and 242 and the through hole 252. As described above, by fixing the case 2 to the object using the protruding portions 23, 24 and 25 protruding toward the outside of the case 2, a wide space for operating a tool such as a driver may be secured and the case 2 may be easily fixed to a subject. In addition, as long as a screw can be inserted, a through hole may be used instead of the notches 232 and 242, and a notch may be used instead of the through hole 252.

The front end surface of the protruding portion 23 is an object abutment surface 231 to be abutted the object, the front end surface of the protruding portion 24 is also an object abutment surface 241 to be abutted the object, and the front end surface of the protruding portion 25 is also an object abutment surface 251 to be abutted the object. Then, for example, the case 2 is fixed to the object in a state where at least one of the object abutment surfaces 231 to 251 abuts the object. Thus, by fixing the case 2 to the object in a state where at least one of the object abutment surfaces 231 to 251 abuts the object, the case 2 is located with respect to the object with high accuracy.

Further, the object abutment surfaces 231, 241, and 251 are respectively formed in an XZ plane parallel to both the X axis and the Z axis. That is, the object abutment surfaces 231, 241, and 251 are parallel to the abutment surface 291, respectively. Therefore, by causing at least one of the object abutment surfaces 231, 241, and 251 to abut the object, the alignment accuracy of the sensor unit 1 with respect to the object may be enhanced, and the measurement axis of the sensor module 3 with respect to the object, in particular, the measurement axes of the acceleration sensors 31x and 31y may be accurately aligned. In particular, in the present embodiment, since the object abutment surfaces 231 and 241 are located on the same plane, the sensor unit 1 may be easily aligned with respect to the object, and the measurement axis of the sensor module 3 may be more accurately aligned with respect to the object by causing the object abutment surfaces 231 and 241 to abut the object, respectively.

In addition, as shown in FIG. 7, in plan view from the Z axis direction, the protrusion 26 is located inside a region Q2 in which the object abutment surface 231 is extended in the Y axis direction which is the normal direction, and the protrusion 27 is located inside a region Q3 in which the object abutment surface 241 is extended in the Y axis direction which is the normal direction. That is, the object abutment surface 231 and the protrusion 26 are disposed side by side in the Y axis direction, and the object abutment surface 241 and the protrusion 27 are disposed side by side in the Y axis direction. As a result, the protrusions 26 and 27 for fixing the sensor module 3 to the case 2 and the protruding portions 23 and 24 for fixing the case 2 to the object may be arranged in the Y axis direction, and the separation distance between the protrusions 26 and 27 and the protruding portions 23 and 24 may be reduced. Therefore, for example, the stress (torque applied at the time of screwing) generated when the case 2 is fixed to the object is less likely to be transmitted to the sensor module 3, and the deviation of the measurement axis of the sensor module 3 in the state of being fixed to the object may be effectively suppressed.

Further, the object abutment surfaces 231, 241, and 251 are formed of cutting surfaces. As a result, the flatness and the parallelism with respect to the XZ plane, of the object abutment surfaces 231, 241, and 251 may be enhanced relative to the state as manufactured by the metal casting method, and thus the alignment accuracy of the sensor unit 1 with respect to the object is further enhanced.

Circuit Substrate

As shown in FIG. 2, the circuit substrate 4 is stored in the case 2 and fixed to the upper surface 391 of the sensor module 3. The circuit substrate 4 is electrically connected to the sensor module 3 through the connector 34, and includes drive circuits for driving the acceleration sensors 31x, 31y and 31z, and a measurement circuit or the like that measures the acceleration in the X axis direction, the acceleration in the Y axis direction, and the acceleration in the Z axis direction based on the measurement signal output from the acceleration sensors 31x, 31y and 31z, for example.

Connector Substrate

As shown in FIG. 2, the connector substrate 5 is located between the side wall portion 2e of the case 2 and the sensor module 3, and is supported by the case 2 in a posture parallel to the side wall portion 2e. The connector substrate 5 is electrically connected to the circuit substrate 4.

Connector

As shown in FIG. 2, the connector 6 is supported by the connector substrate 5. Further, through hole is formed in the side wall portion 2e of the case 2 to penetrate the inside and the outside of the storage space S, and the front end portion of the connector 6 protrudes to the outside from the inside of the case 2 through the through hole. The connector 6 is, for example, a 5-pin connector for connecting the sensor module 3 to an external controller with a bus. The communication protocol is not particularly limited, for example, controller area network (CAN) may be used, and the connector substrate 5 includes a circuit for executing this communication protocol.

Fixing Member 7

The fixing member 7 is made of various metal materials, for example, and has conductivity. Further, as shown in FIG. 5, the fixing member 7 is connected and screwed to the connector 6 from the outside of the case 2 and fixes the connector 6 to the case 2 by sandwiching the side wall portion 2e between the fixing member 7 and the enlarged diameter portion 61 located at the proximal end portion of the connector 6. Further, the fixing member 7 is provided with a plurality of protrusions 71, which penetrate the coating layer 2B of the case 2 and reach the base part 2A. Therefore, the fixing member 7 and the base part 2A are electrically connected. In addition, the fixing member 7 is connected to a grant of the circuit system of the sensor unit 1, for example. Therefore, the case 2 may exhibit a shielding effect, the disturbance may be blocked by the case 2, and various signals generated inside the case 2 may be suppressed from leaking out of the case 2 as disturbances.

The sensor unit 1 has been described above. As described above, the sensor unit 1 like this includes the sensor module 3 and the case 2 having the storage space S for storing the sensor module 3. The sensor module 3 further includes acceleration sensors 31x, 31y and 31z as inertial sensors, and a package 39 for storing the acceleration sensors 31x, 31y and 31z. The package 39 also includes a bottom surface 392 and a side surface 396 connected to the bottom surface 392. Furthermore, the case 2 includes a bottom portion 2b protruding into the storage space S and having the protrusions 26 and 27 with the mounting surface 261 and 271 on which the bottom surface 392 of the sensor module 3 are mounted, and an abutment portion 29 having an abutment surface 291 that abuts the side surface 396 of the sensor module 3. Further, in plan view of the bottom portion 2b, that is, the plan view from the Z axis direction, the separation distances D1 and D2 between the abutment surface 291 and the protrusions 26 and 27 are greater than the separation distance D3 between the abutment surface 291 and the acceleration sensors 31x, 31y and 31z. As described above, when the relationship of D1>D3 and D2>D3 is satisfied, the sensor module 3 may be accurately located with respect to the case 2 by the abutment surface 291 and the mounting surfaces 261 and 271. Therefore, the sensor unit 1 having excellent alignment accuracy may be obtained.

Further, as described above, the normals of the mounting surfaces 261 and 271 are along the Z axis, and the normal of the abutment surface 291 is along the Y axis. Therefore, the angle between the mounting surfaces 261 and 271 and the abutment surface 291 is 90°. As a result, the sensor module 3 may be located more accurately with respect to the case 2 by the abutment surface 291 and the mounting surfaces 261 and 271. Note that, the present disclosure is not limited to this, and the angle between the mounting surfaces 261 and 271 and the abutment surface 291 is not limited to 90°.

In addition, as described above, the inertial sensor includes the acceleration sensor elements 32x, 32y, and 32z as a plurality of inertial sensor elements, and at least one measurement axis of the acceleration sensor elements 32x, 32y, and 32z is orthogonal to the mounting surfaces 261 and 271. In the present embodiment, the measurement axis of the acceleration sensor element 32z is orthogonal to the mounting surfaces 261 and 271. As a result, each of the measurement axes of the acceleration sensor elements 32x, 32y, and 32z may be easily confirmed from the orientations of the mounting surfaces 261 and 271, and the sensor unit 1 may be easily mounted on the object. Note that, the present disclosure is not limited to this, and each of the measurement axes of the acceleration sensor elements 32x, 32y, and 32z may not be orthogonal to the mounting surfaces 261 and 271.

In addition, as described above, the inertial sensor includes the acceleration sensor elements 32x, 32y, and 32z as a plurality of inertial sensor elements, and at least one measurement axis of the acceleration sensor elements 32x, 32y, and 32z is orthogonal to the abutment surface 291. In the present embodiment, the measurement axis of the acceleration sensor element 32y is orthogonal to the abutment surface 291. As a result, each of the measurement axes of the acceleration sensor elements 32x, 32y and 32z may be easily confirmed from the orientation of the abutment surface 291, and the sensor unit 1 may be easily mounted on the object. Note that, the present disclosure is not limited to this, and each of the measurement axes of the acceleration sensor elements 32x, 32y, and 32z may not be orthogonal to the abutment surface 291.

Further, as described above, in plan view of the bottom portion 2b, that is, the plan view from the Z axis direction, the protrusions 26, 27 are located outside the region Q1 in which the abutment surface 291 extends in the Y axis direction which is the normal direction. As a result, the portion of the bottom surface 392 of the sensor module 3, closer to the outer edge may be supported by the mounting surfaces 261 and 271 of the protrusions 26 and 27, so the posture of sensor module 3 mounted on the case 2 is further stabilized. However, the present disclosure is not limited to this, and at least one of the protrusions 26 and 27 may be located inside the region Q1.

Further, as described above, the mounting surfaces 261 and 271 are cutting surfaces. As a result, the flatness and the parallelism with respect to the XY plane, of the mounting surfaces 261 and 271 may be enhanced, and thus the alignment accuracy of the sensor module 3 with respect to the case 2 is further enhanced. Likewise, the abutment surface 291 is a cutting surface. As a result, the flatness and the parallelism with respect to the XZ plane, of the abutment surface 291 may be enhanced, and thus the alignment accuracy of the sensor module 3 with respect to the case 2 is further enhanced. However, the present disclosure is not limited to this, and the mounting surfaces 261 and 271 and the abutment surface 291 may not be cutting surfaces, and may be in the state of being manufactured by metal casting, for example.

Further, as described above, the case 2 includes the object abutment surfaces 231, 241, and 251 to be abutted the object, and is provided with the protruding portions 23, 24, and 25 protruding to the outside of the storage space S. This facilitates positioning of the case 2 with respect to the object. However, the present disclosure is not limited to this, and at least one of the protruding portions 23, 24, and 25 may not be employed or may include more protrusions.

Further, as described above, the object abutment surfaces 231, 241, and 251 are parallel to the abutment surface 291, respectively. As a result, each of the measurement axes of the acceleration sensor elements 32x, 32y, and 32z may be easily confirmed from the orientations of the object abutment surfaces 231, 241, and 251, and the sensor unit 1 may be easily mounted on the object. Note that, the present disclosure is not limited to this, and the object abutment surfaces 231, 241, and 251 may not be orthogonal to the abutment surface 291.

In addition, as described above, the object abutment surfaces 231, 241, and 251 are cutting surfaces. As a result, the flatness and the parallelism with respect to the XZ plane, of the object abutment surfaces 231, 241, 251 may be enhanced, and thus the alignment accuracy of the sensor unit 1 with respect to the object is further enhanced. Note that, the present disclosure is not limited to this, and the object abutment surfaces 231, 241, and 251 may not be cutting surfaces, and may be in the state of being manufactured by metal casting, for example.

Further, as described above, in plan view of the bottom portion 2*b*, that is, in plan view from the Z axis direction, the protrusion 26 is located inside a region Q2 in which the object abutment surface 231 is extended in the Y axis direction which is the normal direction, and the protrusion 27 is located inside a region Q3 in which the object abutment surface 241 is extended in the Y axis direction which is the normal direction. As a result, the separation distance between the object abutment surface 231 and the protrusion 26 and the separation distance between the object abutment surface 241 and the protrusion 27 may be reduced, respectively. Therefore, for example, the stress (torque applied at the time of screwing) generated when the case 2 is fixed to the object is less likely to be transmitted to the sensor module 3, and the deviation of the measurement axis of the sensor module 3 in the state of being fixed to the object may be effectively suppressed. Note that, the present disclosure is not limited to this, and the protrusion 26 may be located outside the region Q2, and the protrusion 27 may be located outside the region Q3.

As described above, the case 2 includes the conductive base part 2A and the insulating coating layer 2B covering the base part 2A. In addition, the sensor unit 1 further includes a fixing member 7 as a conductive member which penetrates the coating layer 2B and is electrically coupled to the base part 2A. As a result, the base part 2A may be connected to the ground through the fixing member 7, for example, and the shielding effect may be exhibited on the case 2. Therefore, the sensor unit 1 is less susceptible to disturbances.

Second Embodiment

Figure 9:
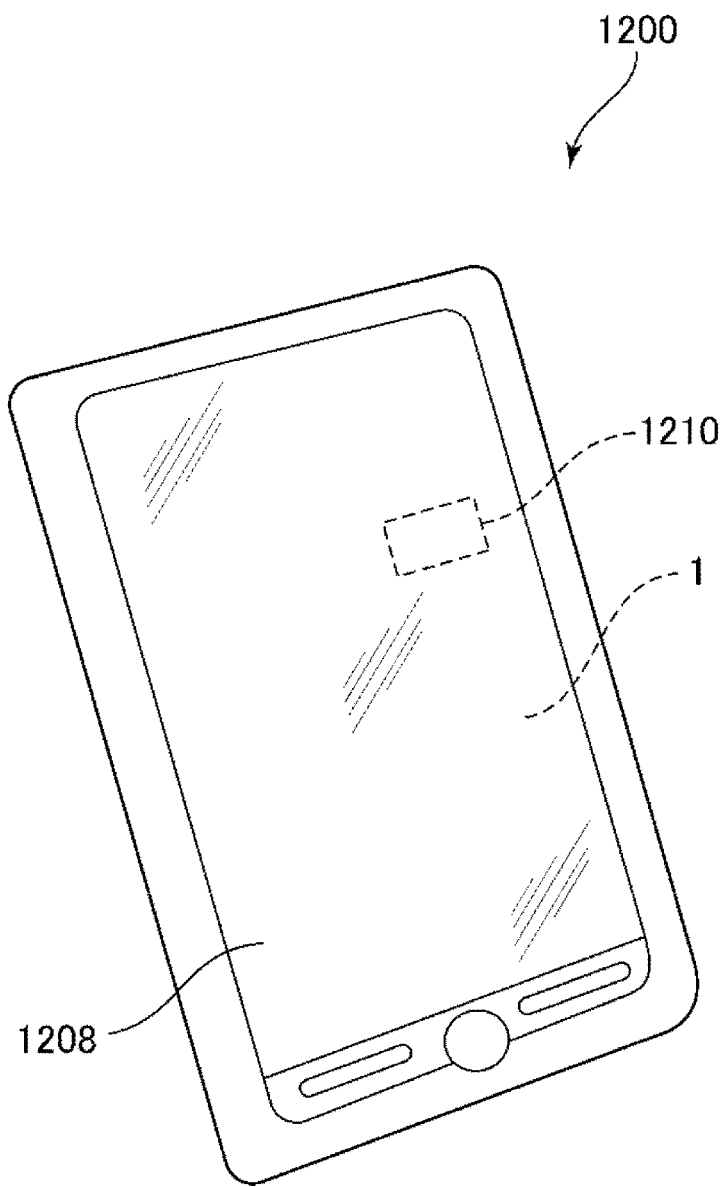
FIG. 9 is a plan view showing a smartphone as an electronic apparatus according to a second embodiment of the present disclosure.

FIG. 9 is a plan view showing a smartphone as an electronic apparatus according to a second embodiment of the present disclosure.

The smartphone 1200 shown in FIG. 9 is an application of the electronic apparatus of the present disclosure. The smartphone 1200 incorporates the sensor unit 1 and a control circuit 1210 that performs control based on a measurement signal output from the sensor unit 1. Measurement data measured by the sensor unit 1 may be transmitted to the control circuit 1210, the control circuit 1210 may recognize the posture and behavior of the smartphone 1200 from the received measurement data, and change the display image displayed on the display unit 1208, emit a warning sound or a sound effect, or drive a vibration motor to vibrate the main body. A smartphone 1200 as such an electronic apparatus includes the sensor unit 1. Therefore, the effects of the sensor unit 1 described above may be obtained, and high reliability may be exhibited.

The electronic apparatus according to the present disclosure may be applied to, in addition to the smartphone 1200 described above, a personal computer, a digital still camera, a tablet terminal, a watch, a smart watch, an inkjet printer, a laptop personal computer, a television, wearable terminal such as an head mounted display (HMD), video camera, video tape recorder, car navigation device, pager, electronic organizer, electronic dictionary, calculator, electronic game machine, word processor, workstation, videophone, television monitor for crime prevention, electronic binoculars, POS terminal, medical equipment, fish finders, various measuring devices, devices for vehicle terminal base stations, various instruments for automobiles, aircrafts, ships, and the like, flight simulators, network servers, and the like, for example.

Third Embodiment

Figure 10:
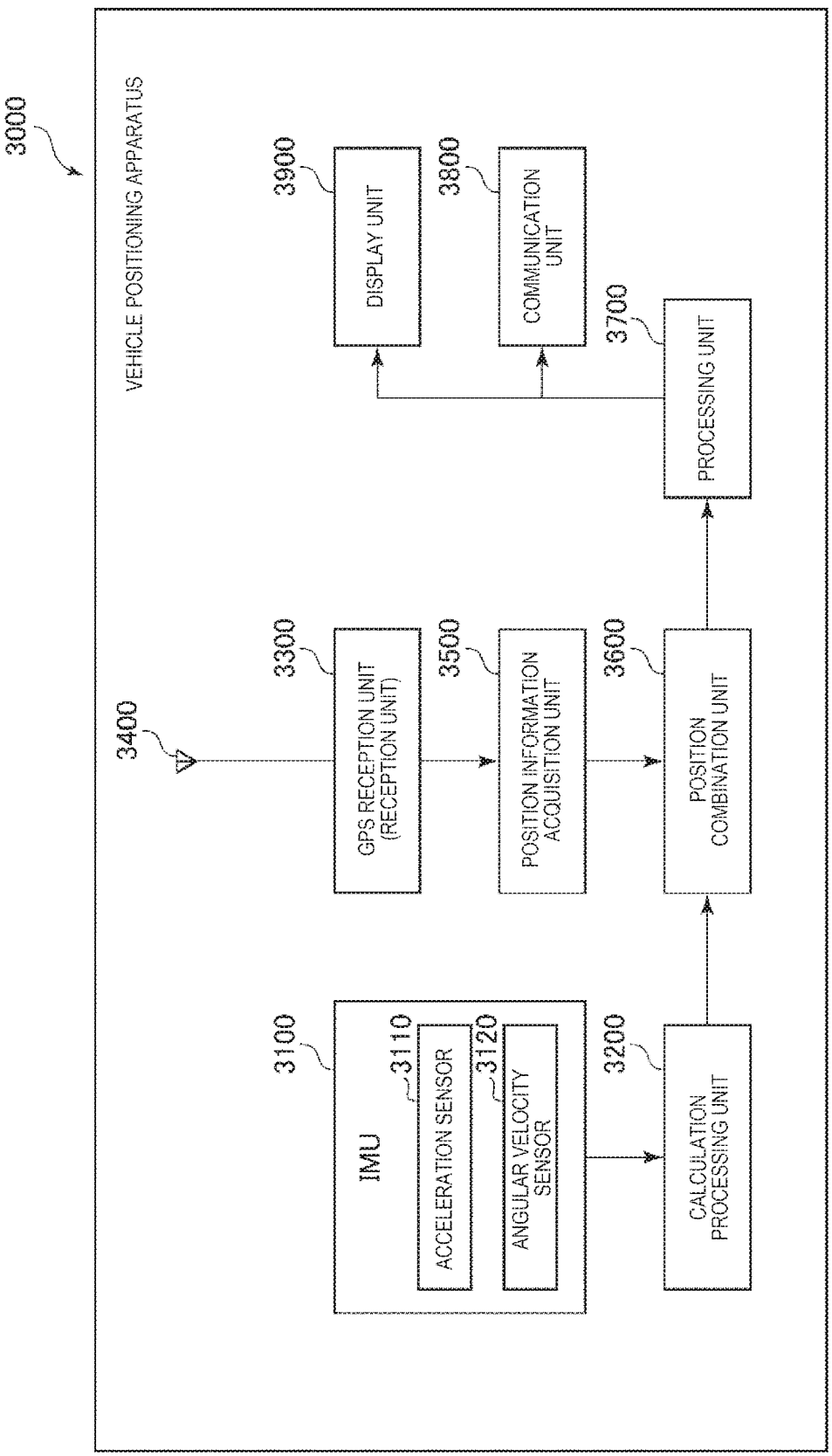
FIG. 10 is a block diagram showing an overall system of a vehicle positioning apparatus as an electronic apparatus according to a third embodiment of the present disclosure.
Figure 11:
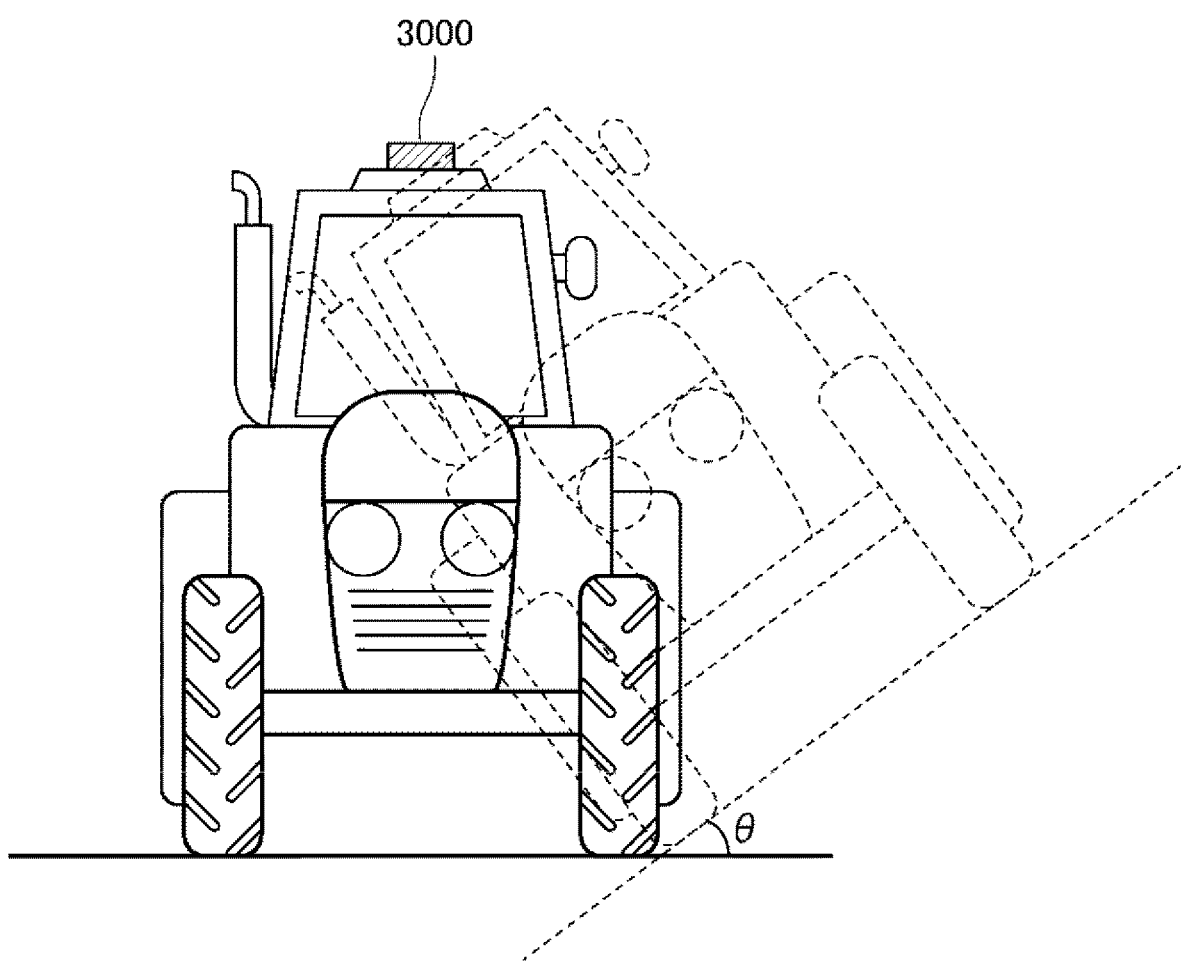
FIG. 11 is a view showing an operation of the vehicle positioning apparatus shown in FIG. 10.

FIG. 10 is a block diagram showing an entire system of a vehicle positioning apparatus as an electronic apparatus according to a third embodiment of the present disclosure. FIG. 11 is a view showing the operation of the vehicle positioning apparatus shown in FIG. 10.

A vehicle positioning apparatus 3000 shown in FIG. 10 is a device mounted on a vehicle and used to perform the positioning of the vehicle. The vehicle is not particularly limited, and may be any of a bicycle, an automobile, a motorcycle, a train, an airplane, a ship, and the like, and in the present embodiment, a case where a four-wheel automobile is used as the vehicle will be described.

The vehicle positioning apparatus 3000 includes an inertial measurement device 3100 (IMU), a calculation processing unit 3200, a GPS reception unit 3300, a reception antenna 3400, a position information acquisition unit 3500, a position combination unit 3600, a processing unit 3700, a communication unit 3800, and a display unit 3900. As the inertial measurement device 3100, the sensor unit 1 described above may be used, for example.

The inertial measurement device 3100 includes a three-axis acceleration sensor 3110 and a three-axis angular velocity sensor 3120. The calculation processing unit 3200 receives the acceleration data from the acceleration sensor 3110 and the angular velocity data from the angular velocity sensor 3120, performs inertial navigation arithmetic processing on these data, and outputs inertial navigation positioning data including the acceleration and posture of the vehicle.

In addition, the GPS reception unit 3300 receives a signal from a GPS satellite through the reception antenna 3400. Further, based on the signal received by the GPS reception unit 3300, the position information acquisition unit 3500 outputs GPS positioning data representing the position (latitude, longitude, altitude), velocity, and orientation of the vehicle positioning apparatus 3000. The GPS positioning data also includes status data indicating a reception state, a reception time, and the like.

The position combination unit 3600 calculates the position of the vehicle, specifically, on which position on the ground the vehicle is traveling based on the inertial navigation positioning data output from the calculation processing unit 3200 and the GPS positioning data output from the position information acquisition unit 3500. For example, even when the position of the vehicle included in the GPS positioning data is the same, as shown in FIG. 11, when the posture of the vehicle is different due to the influence of the inclination of the ground and the like, the vehicle is traveling at different positions on the ground. Therefore, it is not possible to calculate the accurate position of the vehicle using GPS positioning data alone. Therefore, the position combination unit 3600 uses inertial navigation positioning data to calculate which position on the ground the vehicle is traveling.

The position data output from the position combination unit 3600 is subjected to predetermined processing by the processing unit 3700, and displayed on the display unit 3900 as a positioning result. The position data may be transmitted to the external device by the communication unit 3800.

Fourth Embodiment

Figure 12:
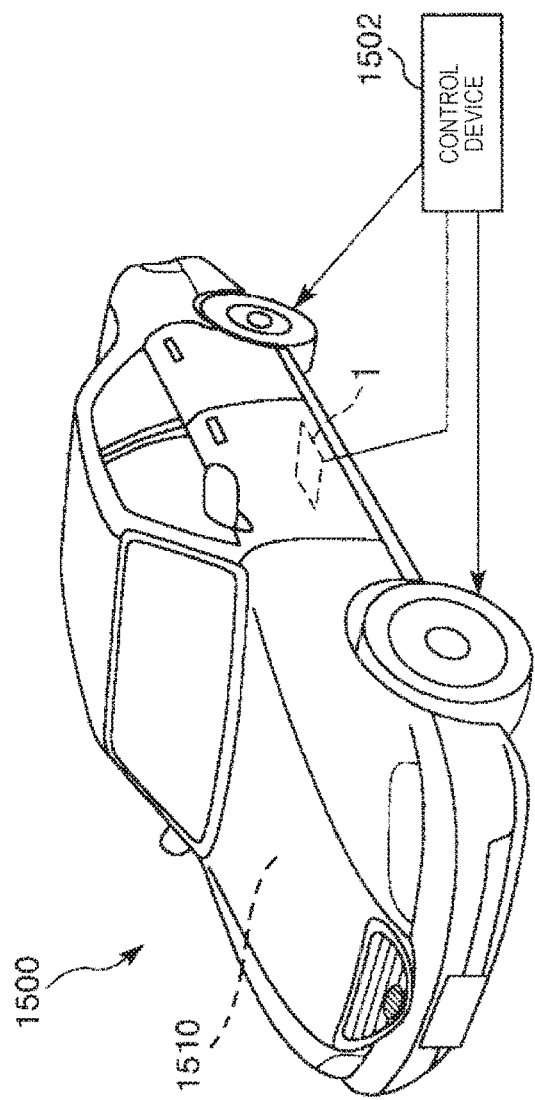
FIG. 12 is a perspective view showing a vehicle according to a fourth embodiment of the present disclosure.

FIG. 12 is a perspective view showing a vehicle according to the fourth embodiment of the present disclosure.

An automobile 1500 shown in FIG. 12 is an automobile to which the vehicle according to the present disclosure is applied. In this figure, the automobile 1500 includes at least one system 1510 of an engine system, a brake system and a keyless entry system. In addition, the sensor unit 1 is built in the automobile 1500, and the posture of the vehicle body 1501 may be measured by the sensor unit 1. The measurement signal of the sensor unit 1 is supplied to the control device 1502, and the control device 1502 may control the system 1510 based on the signal.

As described above, the automobile 1500 as a vehicle includes the sensor unit 1. Therefore, the effects of the sensor unit 1 described above may be obtained, and high reliability may be exhibited.

In addition, the sensor unit 1 may be widely applied to a vehicle navigation system, a vehicle air conditioner, an antilock brake system (ABS), an air bag, a tire pressure monitoring system (TPMS), an engine controller, and an electronic control unit (ECU) such as battery monitors of a hybrid automobile or an electric automobile. In addition, the vehicle is not limited to the automobile 1500, and may be applied to airplanes, rockets, artificial satellites, ships, unmanned transport vehicles (AGV), biped robots, unmanned airplanes such as drone, and the like, for example.

Although the sensor unit, the electronic apparatus, and the vehicle according to the present disclosure have been described above based on the illustrated embodiment, the present disclosure is not limited thereto, and the configuration of each part may be replaced by any configuration having the same function. In addition, any other component may be added to the present disclosure. In addition, the embodiments described above may be combined as appropriate.

What is claimed is:

1. A sensor unit comprising:
a sensor module including an inertial sensor and a package for storing the inertial sensor; and
a case including a storage space for storing the sensor module,
wherein the package includes
a bottom surface, and
a side surface connected to the bottom surface, and
the case includes
a bottom portion on which a protrusion is disposed, the protrusion protruding into the storage space and including a mounting surface on which the bottom surface of the sensor module is placed, and
an abutment portion having an abutment surface abutting on the side surface of the sensor module,
in plan view of the bottom portion, a separation distance between the abutment surface and the protrusion is longer than a separation distance between the abutment surface and the inertial sensor.

2. The sensor unit according to claim 1,
wherein an angle between the mounting surface and the abutment surface is 90°.

3. The sensor unit according to claim 1,
wherein the inertial sensor includes a plurality of inertial sensor elements, and
a measurement axis of at least one of the inertial sensor elements is orthogonal to the mounting surface.

4. The sensor unit according to claim 1,
wherein the inertial sensor includes a plurality of inertial sensor elements, and
a measurement axis of at least one of the inertial sensor elements is orthogonal to the abutment surface.

5. The sensor unit according to claim 1,
wherein, in plan view of the bottom portion,
the protrusion is located outside a region extending from the abutment surface in a normal direction of the abutment surface.

6. The sensor unit according to claim 1,
wherein the mounting surface is a cutting surface.

7. The sensor unit according to claim 1,
wherein the abutment surface is a cutting surface.

8. The sensor unit according to claim 1,
wherein the case is provided with a protruding portion including an object abutment surface to be abutted on an object and protruding to the outside of the storage space.

9. The sensor unit according to claim 8,
wherein the object abutment surface is parallel to the abutment surface.

10. The sensor unit according to claim 8,
wherein the object abutment surface is a cutting surface.

11. The sensor unit according to claim 8,
wherein, in plan view of the bottom portion,
the protrusion is located inside a region of the object abutment surface, extending in the normal direction.

12. The sensor unit according to claim 1,
wherein the case includes
a conductive base part,
an insulating coating layer covering the base part, and
a conductive member penetrating the coating layer and electrically connected to the base part.

13. An electronic apparatus comprising the sensor unit according to claim 1.

14. A vehicle comprising the sensor unit according to claim 1.

* * * * *